(12) United States Patent
Wuillaume et al.

(10) Patent No.: US 7,621,648 B2
(45) Date of Patent: Nov. 24, 2009

(54) FIRST SURFACE MIRROR WITH CHROMIUM NITRIDE LAYER

(75) Inventors: Francis Wuillaume, Plymouth, MI (US); Anton Dietrich, Fontnas (CH); Brent Boyce, Novi, MI (US); Gregory Scott, Shelby Township, MI (US)

(73) Assignees: Guardian Industries Corp., Auburn Hills, MI (US); Centre Luxembourgeois de Recherches pour le Verre et la Ceramique S.A. (C.R.V.C.), Grand Duche de Luxembourg (LU)

( * ) Notice: Subject to any disclaimer, the term of this patent is extended or adjusted under 35 U.S.C. 154(b) by 0 days.

(21) Appl. No.: 11/892,500

(22) Filed: Aug. 23, 2007

(65) Prior Publication Data

US 2007/0291381 A1 Dec. 20, 2007

Related U.S. Application Data

(62) Division of application No. 10/959,321, filed on Oct. 7, 2004.

(51) Int. Cl.
G02B 7/182 (2006.01)
(52) U.S. Cl. ..................................... 359/883
(58) Field of Classification Search .................. 359/883
See application file for complete search history.

(56) References Cited

U.S. PATENT DOCUMENTS

| | | | |
|---|---|---|---|
| 4,309,075 A | 1/1982 | Apfel et al. | |
| 4,780,372 A | 10/1988 | Tracy et al. | |
| 4,943,486 A | 7/1990 | Uchiyama | |
| 5,112,693 A | 5/1992 | Gillery | |
| 5,563,734 A * | 10/1996 | Wolfe et al. ............... | 359/360 |
| 5,669,681 A | 9/1997 | Ishikawa et al. | |
| 5,896,236 A | 4/1999 | Lostumo et al. | |
| 5,923,464 A | 7/1999 | Braun | |
| 6,059,909 A | 5/2000 | Hartig et al. | |
| 6,078,425 A | 6/2000 | Wolfe et al. | |
| 6,212,004 B1 * | 4/2001 | Stachowiak et al. ......... | 359/360 |
| 6,275,272 B1 | 8/2001 | Park | |

(Continued)

FOREIGN PATENT DOCUMENTS

EP 0456488 11/1991

(Continued)

OTHER PUBLICATIONS

Ando, E. "Optical and mechanical properties of Cr and CRN[s] films by dc magnetron sputtering." 1997 New Technology Development Center, Asahi Glass Co.*

(Continued)

*Primary Examiner*—Joshua L Pritchett
(74) *Attorney, Agent, or Firm*—Nixon & Vanderhye P.C.

(57) ABSTRACT

A mirror (e.g., first surface mirror) is provided with a layer of or including chromium nitride ($CrN_x$). In certain example embodiments, the $CrN_x$ layer may be the primary reflective layer of the mirror. Surprisingly and unexpectedly, it has been found the addition of nitrogen to the chromium to form $CrN_x$ reduces pinhole formations in the resulting layer. In certain example embodiments, the more nitrogen which is introduced into the layer, the smaller the number and/or size of pinholes in the Cr inclusive layer. In certain example embodiments, it has also been found that the addition of nitrogen to Cr may improve durability.

12 Claims, 4 Drawing Sheets

U.S. PATENT DOCUMENTS

| | | |
|---|---|---|
| 6,524,714 B1 | 2/2003 | Neuman et al. |
| 6,558,010 B2 | 5/2003 | Takahashi |
| 6,576,349 B2 | 6/2003 | Lingle et al. |
| 6,749,307 B2 * | 6/2004 | Laroche et al. ............. 359/838 |
| 6,778,315 B2 | 8/2004 | Guo et al. |
| 6,783,253 B2 | 8/2004 | Thomsen et al. |
| 2003/0175527 A1 * | 9/2003 | Lingle ........................ 428/426 |
| 2003/0180546 A1 | 9/2003 | Stachowiak et al. |
| 2003/0219654 A1 * | 11/2003 | Ushida et al. .................. 430/5 |
| 2006/0152832 A1 * | 7/2006 | Aumercier et al. .......... 359/883 |

FOREIGN PATENT DOCUMENTS

| | | |
|---|---|---|
| EP | 0632294 | 1/1995 |
| JP | 63-315541 | 12/1988 |
| WO | WO 2004/034105 | 4/2004 |

OTHER PUBLICATIONS

U.S. Appl. No. 10/959,321, filed Oct. 7, 2004.

* cited by examiner

FIRST SURFACE MIRROR WITH CHROMIUM NITRIDE LAYER

This application is a divisional of application Ser. No. 10/959,321, filed Oct. 7, 2004, the entire content of which is hereby incorporated herein by reference in this application.

This application is related to a first-surface mirror including a layer of or including chromium nitride ($CrN_x$). In certain example embodiments, a reflective layer of the mirror comprises chromium nitride, and is nitrided to an extent so as to reduce undesirable pinhole formation and/or improve adhesion. In certain example non-limiting instances, such first surface mirrors may be used in the context of a projection television (PTV) apparatus, automotive mirrors, or in any other suitable application.

BACKGROUND OF THE INVENTION

Mirrors for various uses are known in the art. For example, see U.S. Pat. Nos. 5,923,464 and 4,309,075 (all hereby incorporated herein by reference). Mirrors are also known for use in projection televisions and other suitable applications. In the projection television context, see for example U.S. Pat. Nos. 6,275,272, 5,669,681 and 5,896,236 (all hereby incorporated herein by reference).

One type of mirror is a second or back surface mirror (most common), while another type of mirror is a first or front surface mirror (less common). Back surface mirrors typically include a glass substrate with a reflective coating on a back surface thereof (i.e., not on the front surface which is first hit by incoming light). Incoming light passes through the glass substrate before being reflected by the coating in a second surface mirror. Thus, reflected light passes through the glass substrate twice in back or second surface mirrors; once before being reflected and again after being reflected on its way to a viewer. In certain instances, passing through the glass substrate twice can create ambiguity in directional reflection and imperfect reflections may sometimes result. Mirrors such as bathroom mirrors, bedroom mirrors, and architectural mirrors are typically back or second surface mirrors so that the glass substrate can be used to protect the reflective coating provided on the rear surface thereof.

In applications where more accurate reflections are desired, front (or first) surface mirrors (FSMs) are often used. In front/first surface mirrors, a reflective coating is provided on the front surface of the glass substrate so that incoming light is reflected by the coating before it passes through the glass substrate. Since the light to be reflected does not have to pass through the glass substrate in first surface mirrors (in contrast to rear surface mirrors), first surface mirrors generally have higher reflectance than do rear surface mirrors, and no or less double reflected image. Example front surface mirrors (or first surface mirrors) are disclosed in U.S. Pat. Nos. 6,783,253, 5,923,464 and 4,780,372 (all incorporated herein by reference).

It has been proposed to use a metallic chromium (Cr) reflective layer in a first surface mirror. In particular, the proposed mirror includes a layer of metallic Cr located directly on and contacting a glass substrate. Unfortunately, such first surface mirrors with a structure of glass/Cr suffer from pinhole related problems. In particular, such a mirror structure is susceptible to pinhole formation in the metallic Cr layer, especially as the Cr layer thickness increases in applications where lower transmission (e.g., 0.5% visible transmission) are desired. Light tends to leak through such pinholes making large numbers of them especially undesirable in mirror applications where reflectance (not transmission) of light is desired.

It will be apparent from the above that there exists a need in the art for a first/front surface mirror, or other type of mirror, that is less susceptible to significant amounts of pinhole formations.

BRIEF SUMMARY OF EXAMPLE EMBODIMENTS OF INVENTION

In certain embodiments of this invention, a mirror such as a front surface mirror (FSM) is provided with a layer of or including chromium nitride ($CrN_x$). In certain example embodiments, the $CrN_x$ layer may be the primary reflective layer of the mirror.

Surprisingly and unexpectedly, it has been found the addition of nitrogen to the chromium to form $CrN_x$ reduces pinhole formations in the resulting layer, without strongly affecting the mirror's reflective properties. In certain example embodiments, the more nitrogen which is introduced into the layer, the smaller the number and/or size of pinholes in the Cr inclusive layer. In certain example embodiments, it has also been found that the addition of nitrogen to Cr may improve durability of the mirror.

In certain example embodiments of this invention, first surface mirrors including such a layer may be used in projection televisions, copiers, scanners, bar code readers, overhead projectors, automotive mirrors (e.g., rearview mirrors, interior or exterior), and/or any other suitable applications.

In certain example embodiments of this invention, there is provided a mirror comprising a substrate supporting a coating, wherein the coating includes at least a reflective layer comprising fully or partially nitridic chromium.

In other example embodiments of this invention, there is provided a mirror comprising a glass substrate supporting a layer comprising chromium nitride, and wherein the mirror has a visible transmission of no greater than 5%.

In still further example embodiments of this invention, there is provided a method of making a mirror, the method comprising providing a glass substrate; sputtering a target comprising Cr in an atmosphere comprising nitrogen gas (and possibly other gas or gases such as argon) in order to form a layer comprising chromium nitride on the glass substrate; and wherein said sputtering comprises using a nitrogen gas flow in the atmosphere which represents from about 1-21% of total gas flow in the atmosphere.

DETAILED DESCRIPTION OF EXAMPLE EMBODIMENTS OF THE INVENTION

Figure 1:
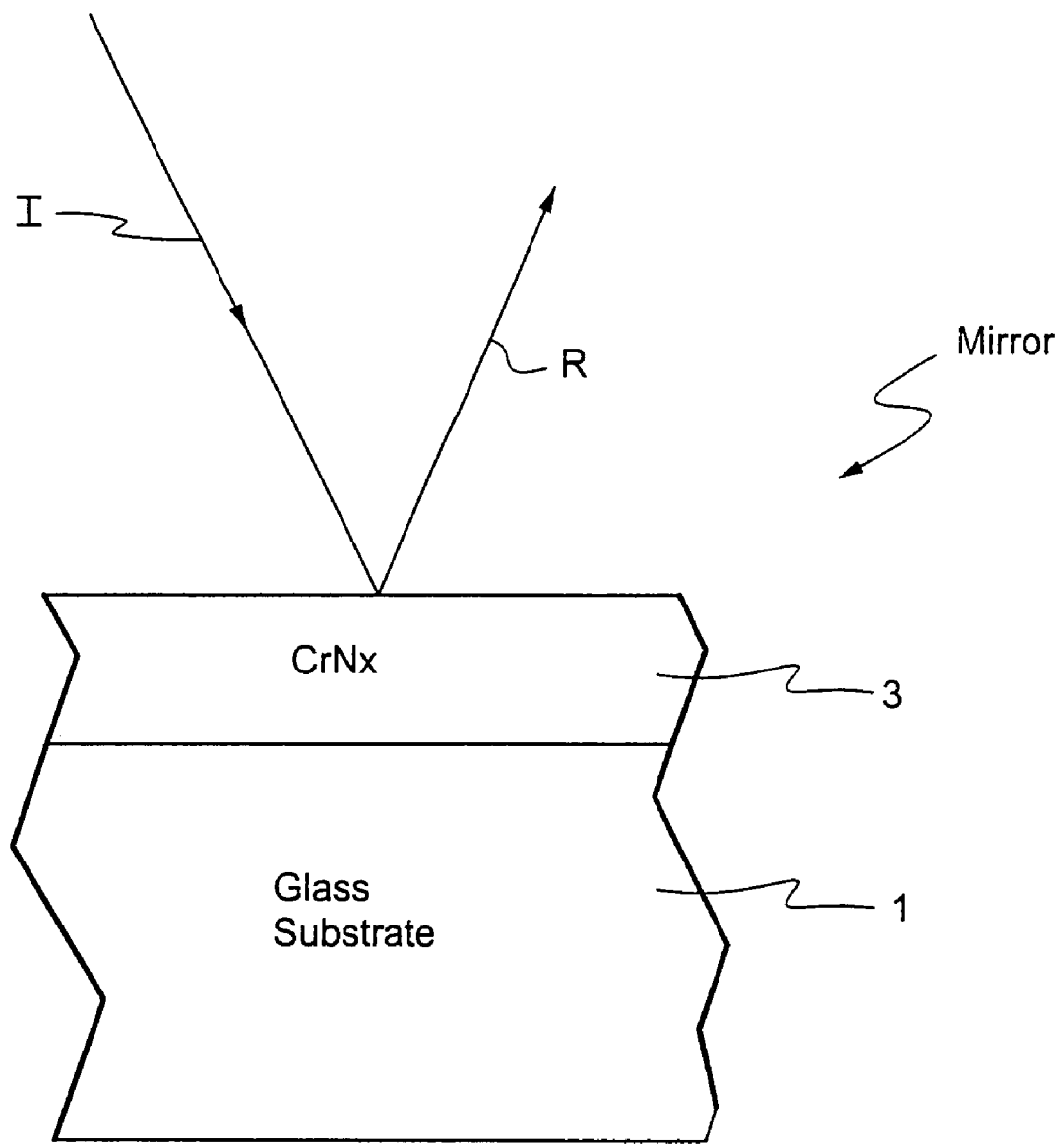
FIG. 1 is a cross sectional view of a first surface mirror according to an example embodiment of this invention.

The instant invention relates to a mirror that may be used in the context of projection televisions (PTVs), copiers, scanners, bar code readers, overhead projectors, and/or any other suitable applications. In certain embodiments, the mirror includes a layer of or including $CrN_x$. The $CrN_x$ layer may be used as the only or primary reflective layer of the mirror in certain example embodiments of this invention. In certain example embodiments, a front surface mirror (FSM) is provided with a layer of or including chromium nitride ($CrN_x$). The $CrN_x$ layer may be formed by physical vapor deposition such as sputtering, or in any other suitable manner in different embodiments of this invention.

Most in the art would not add nitrogen to a reflective layer in a mirror, because nitrogen tends to degrade reflection characteristics which are of course highly desirable in mirrors. However, surprisingly and unexpectedly, it has been found the addition of nitrogen to the chromium to form $CrN_x$ reduces pinhole formations in the resulting layer, without significantly adversely affecting the mirror's reflective properties. In certain example embodiments, the more nitrogen which is introduced into the layer, the smaller the number and/or size of pinholes in the Cr inclusive layer. In certain example embodiments, it has also been found that the addition of nitrogen to Cr may also improve durability of the mirror.

It has also been found that the addition of nitrogen tends to reduce stress of the Cr inclusive layer thereby making it closer to zero (compared to if no nitrogen was present given a Cr layer of the same thickness). Thus, the stress in layer 3 tends to be less when nitrogen is added (resulting in a $CrN_x$ layer), so that the adhesive force of layer 3 to the glass is less likely to be overcome causing delamination. Durability is improved in this respect, and this may lead to less pinholes due to improved adhesion.

Introduction of nitrogen during physical vapor deposition (e.g., sputtering) of a metal-based first surface mirror on either a bulk or graded basis has been found to significantly reduce the formation of pinholes. Nitrogen may have multiple effects which reduce the formation of pinholes, such as stress reduction of the Cr inclusive layer, reduced adhesion to any optional protective tape applied to the Cr inclusive layer surface, and/or increased adhesion of the Cr inclusive layer to the underlying glass substrate. Although nitrogen would typically be thought to have a strong adverse effect on reflective properties, it has surprisingly been found that it is possible to choose nitrogen flow levels which reduce pinholes and/or improve durability while at the same time do not sacrifice desired mirror-like reflection properties. For instances, in certain example embodiments, the Cr inclusive layer is only partially nitrided, and/or is nitrided only at a portion thereof such as a bottom portion thereof, thereby permitting less pinholes and/or improved durability to be achieved in combination with satisfactory mirror optical properties such as reflection and/or color.

FIG. 1 is a cross sectional view of a first surface mirror (FSM) according to an example embodiment of this invention. The first surface mirror of FIG. 1 includes glass substrate 1 and reflective layer 3 of or including $CrN_x$. Glass substrate 1 may be from about 1-10 mm thick in different embodiments of this invention, and may be any suitable color (e.g., grey, clear, green, blue, etc.). In certain example instances, glass (e.g., soda lime silica type glass) substrate 1 is from about 1-5 mm thick, most preferably from about 2 to 3 mm thick. When substrate 1 is glass, it may have an index of refraction value "n" of from about 1.48 to 1.53 (most preferably about 1.51 to 1.52). In FIG. 1, incident light is represented by I, and reflected light by R.

Reflective layer 3 may be composed of or comprise $CrN_x$ in certain example embodiments of this invention. Reflective layer 3 reflects the majority of incoming light before it reaches glass substrate 1 and directs it toward a viewer away from the glass substrate, so that the mirror is referred to as a first surface mirror. In certain example embodiments of this invention, the reflective $CrN_x$ layer 3 may be formed on glass substrate 1 by sputtering a Cr target in an atmosphere including argon (Ar) and nitrogen (N) gas, although other methods may instead be used in alternative embodiments. The nitrogen content in the layer 3 may be uniformly provided throughout the layer, or alternatively may be graded (e.g., see discussion with respect to FIG. 5 below).

In certain example embodiments of this invention (e.g., embodiments of FIGS. 1-5), $CrN_x$ layer 3 may be from about 200 to 700 Å thick, more preferably from about 250 to 600 Å thick. The thickness of layer 3 can be tuned based on the reflection (and thus inversely transmission) desired. For purposes of example only, when a visible transmission of light through the mirror of about 2.5% is desired, $CrN_x$ layer 3 may be about 300 Å thick. However, when a visible transmission of light through the mirror of about 0.5% is desired, $CrN_x$ layer 3 may be about 525 Å thick. Pinholes in metallic Cr layers are particularly problematic at higher thicknesses. Thus, when lower visible transmission are desired, and thus higher thicknesses, the addition of nitrogen to the Cr inclusive reflective layer is especially beneficial. The use of nitrogen in a Cr inclusive layer may be used at any thickness in different embodiments of this invention. However, in view of the above, the addition of nitrogen to the Cr inclusive reflective layer to form a $CrN_x$ layer 3 is especially beneficial, for example, at layer 3 thicknesses of at least about 300 Å, more preferably of at least about 350 Å, and most preferably of at least about 400 Å.

The mirror, in certain example embodiments of this invention (e.g., FIGS. 1-5), has a visible light transmission of no greater than 10%, more preferably no greater than 5%, even more preferably no greater than 3%, still more preferably no greater than 2.5%, sometimes no greater than 1.5%, and possibly no greater than about 0.5% in certain example instances. Moreover, the mirror in certain example embodiments of this invention (e.g., FIGS. 1-5) has a reflectance (e.g., from the film side, Hunter measured as Rf Y) of at least 50%, more preferably of at least 60%.

Moreover, in certain example embodiments of this invention (e.g., embodiments of FIGS. 1-5), the mirror has a reflective a* color (film side, Hunter measured) of from −2 to +2, more preferably from −1.5 to +1.5, and most preferably from −1 to +1. Also, in certain example embodiments of this invention, the mirror has a reflective b* color (film side, Hunter measured) of from −3 to +2, more preferably from −3 to +1.5, and even more preferably from −1.5 to +1.0.

While only layer 3 is provided on the substrate 1 in the FIG. 1 embodiment, this invention is not so limited. For example, and without limitation, other layer(s) may be provided between layer 3 and the substrate 1 in certain example embodiments of this invention. For instance, a dielectric layer may be provided between reflective layer 3 and glass substrate 1. Moreover, other layer(s) such as a dielectric layer(s) may be provide on the glass substrate 1 over reflective layer 3. As another alternative embodiment(s) of this invention, Cr may be replaced in the reflective layer 3 by Al, Ag, or any other reflective material whose film stress is reduced by addition of nitrogen in any embodiment of this invention.

Figure 2:
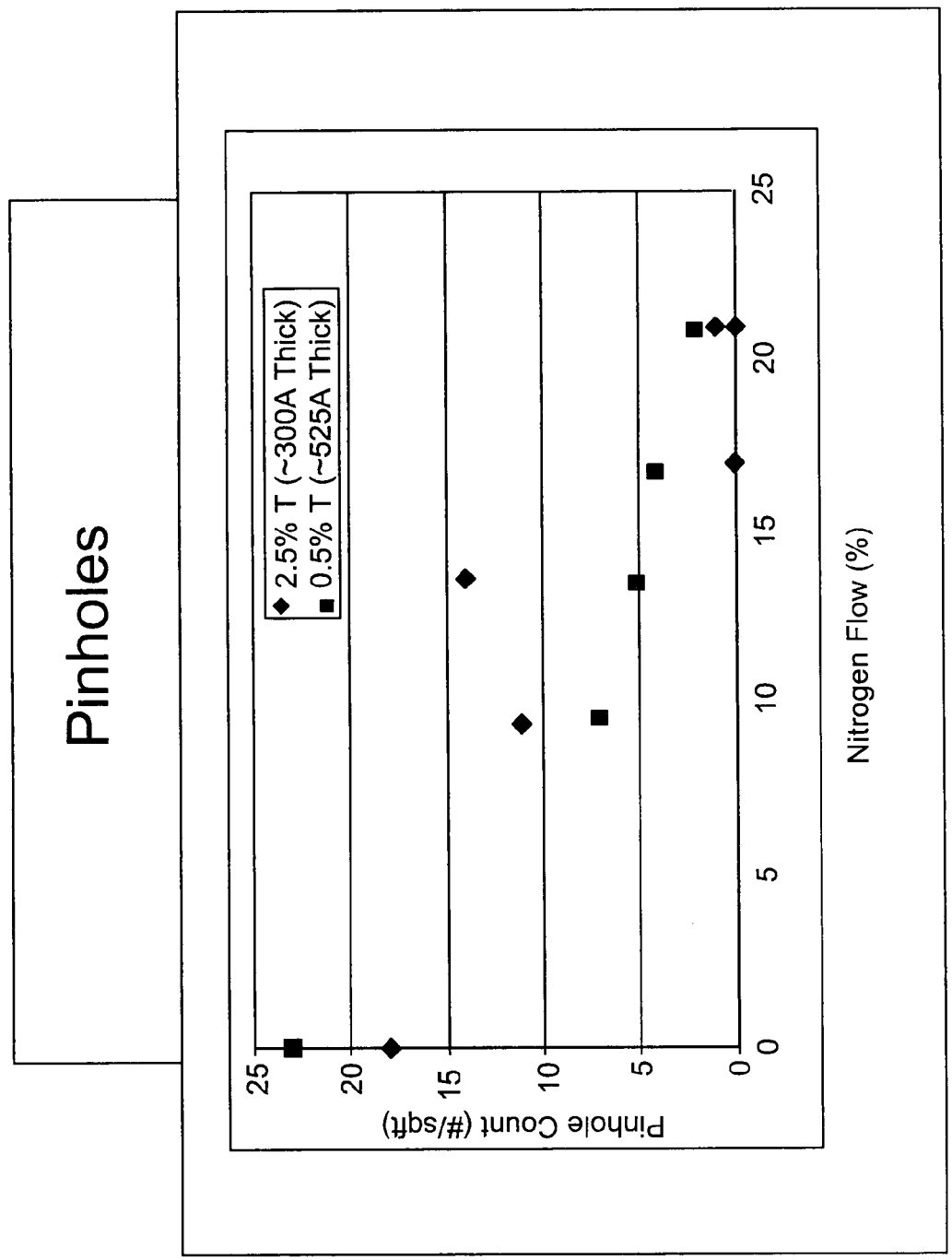
FIG. 2 is a graph illustrating that pinholes in a $CrN_x$ layer decrease in number as nitrogen content increases in a $CrN_x$ layer in a mirror.

FIG. 2, based on example data, is a graph plotting the number of pinholes in layer 3 per square foot (vertical axis of graph) versus nitrogen flow in the sputtering of CrN$_x$ layer 3 from a Cr sputtering target. The nitrogen flow % (horizontal axis of graph) is the percentage of the overall gas flow (using only Ar and N$_2$) made up of nitrogen. For example, if the gas flow used in sputtering CrN$_x$ layer 3 was 162 sccm nitrogen gas and 788 sccm argon gas (i.e., 17% nitrogen and 83% argon), then the nitrogen gas flow amount would be 17% (i.e., 162/950=17%).

Still referring to FIG. 2, it can be seen that the addition of nitrogen to the Cr inclusive layer reduces the number of pinholes which end up therein. For example, as shown in FIG. 2, when no nitrogen is used in the layer (i.e., for a metallic Cr layer, where the intentional gas flow was 100% argon), in a 300 Å Cr layer there were about 18 pinholes per square foot and in a 525 Å Cr layer there were about 23 pinholes per square foot. However, when nitrogen gas was added to the gas in the sputtering chamber to form a CrN$_x$ layer 3, the number of pinholes significantly dropped. For instance, at about a 9% nitrogen gas flow for the CrN$_x$ layer 3, when the layer was about 300 Å thick on the glass substrate there were about 11 pinholes per square foot (down from about 18 pinholes at 0% nitrogen gas flow for a layer of similar thickness) and in a 525 Å thick CrN$_x$ layer 3 there were about 7 pinholes (down from about 23 pinholes at 0% nitrogen gas flow for a layer of similar thickness) per square foot. As another example shown in FIG. 2, at about a 17% nitrogen gas flow (i.e., 17% of the gas in the sputtering chamber was nitrogen, and the rest was argon) for the CrN$_x$ layer 3, when the layer was about 300 Å thick on the glass substrate there were no pinholes per square foot (down from about 18 pinholes at 0% nitrogen gas flow for a layer of similar thickness) and in a 525 Å thick CrN$_x$ layer 3 there were about 4 pinholes (down from about 23 pinholes at 0% nitrogen gas flow for a layer of similar thickness) per square foot. Thus, it can be seen from FIG. 2 that the addition of nitrogen to the Cr inclusive layer, to form a CrN$_x$ layer 3, significantly reduces the number of pinholes in a Cr inclusive layer in an unexpected and surprising manner.

Figure 3:
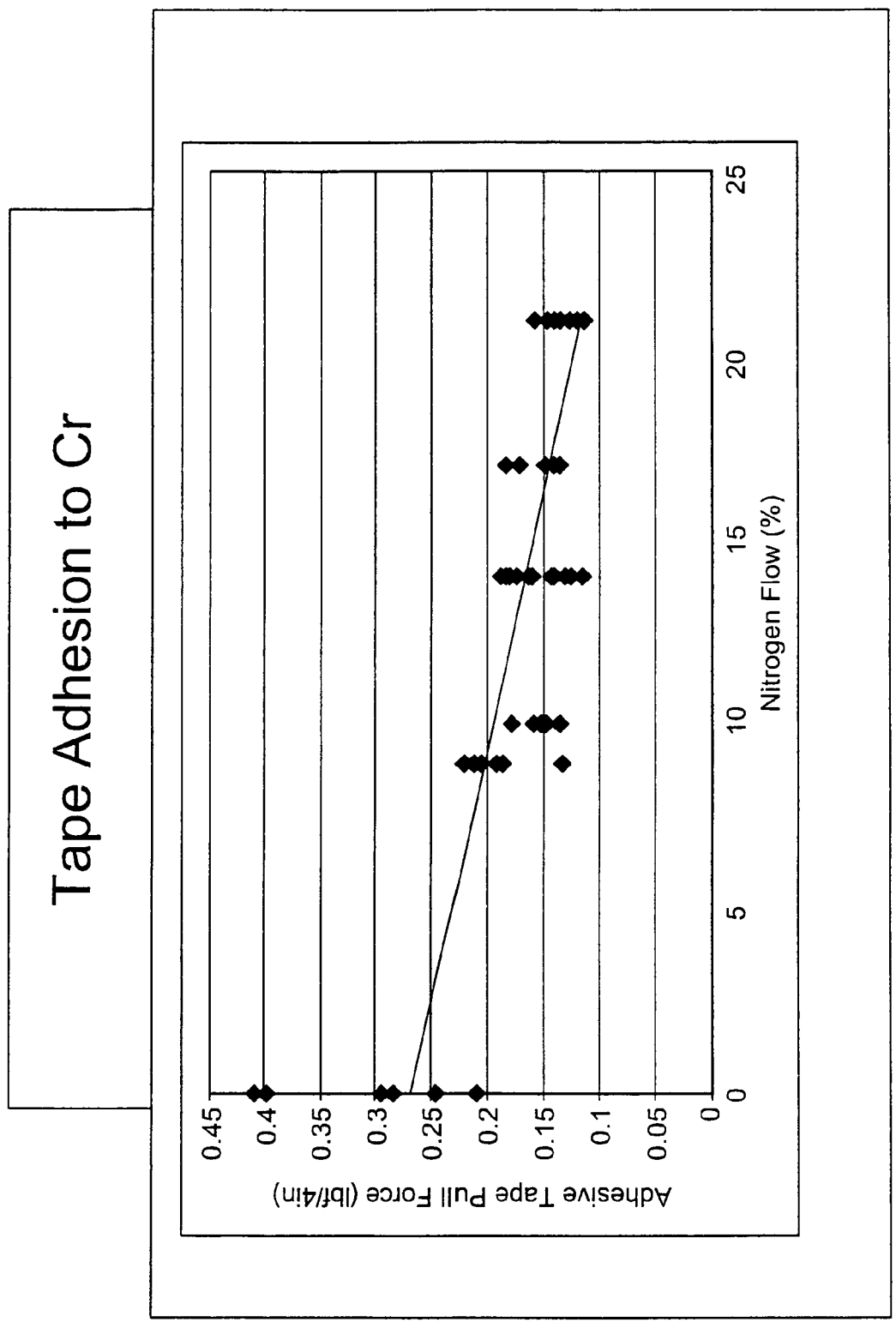
FIG. 3 is a graph illustrating that the adhesion force of protective tape to a Cr inclusive layer in a mirror decreases as nitrogen content in the layer increases, thereby indicating that durability of an exposed $CrN_x$ layer increases as nitrogen content increases since the protective tape is less likely to pull off parts of the layer when the tape is removed.

Protective tape is sometimes applied to the surface of a mirror during shipment, handling, and the like, and is then removed upon installation of the mirror. Sometimes, pinholes form in layer(s) of the mirror when the tape is removed. It is believed that this may be due to the tape pulling off some material of the coating when the tape is removed. Thus, it may be advantageous to reduce the adhesion strength of tape to a coating. In this regard, FIG. 3 is a graph based on example data illustrating that the adhesion force of protective tape to a Cr inclusive layer in a mirror decreases as nitrogen content in the layer increases, thereby indicating that durability of an exposed CrN$_x$ layer 3 can increase as nitrogen content increases since the protective tape is less likely to pull off parts of the layer when the tape is removed. The horizontal axis in FIG. 3 is the same as the horizontal axis in FIG. 2. Thus, FIG. 3 illustrates that the mirror may become more durable as nitrogen content in CrN$_x$ layer 3 increases.

Figure 4:
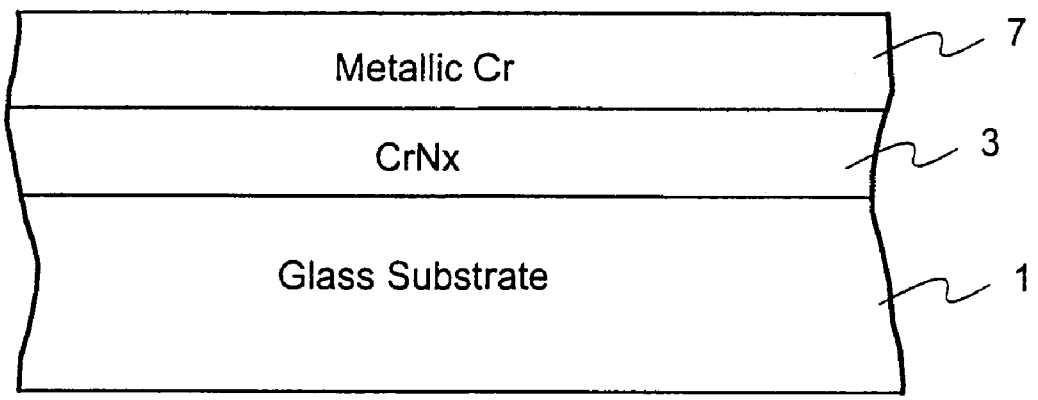
FIG. 4 is a cross sectional view if a first surface mirror according to another example embodiment of this invention.

FIG. 4 illustrates another example embodiment of this invention. In the FIG. 4 embodiment, the first surface mirror includes glass substrate 1, CrN$_x$ layer 3 (discussed above), and metallic or substantially Cr layer 7. Each of layers 3 and 7 may act as reflective layers in the FIG. 4 embodiment. In the FIG. 4 embodiment, the CrN$_x$ layer 3 helps reduce the number of pinholes in the coating thereby improving characteristics of the mirror, and the metallic Cr layer 7 may provide excellent reflection characteristics. In the FIG. 4 embodiment, it is possible that the CrN$_x$ layer 3 may be thinned relative to the thicknesses for the layer discussed above.

Figure 5:
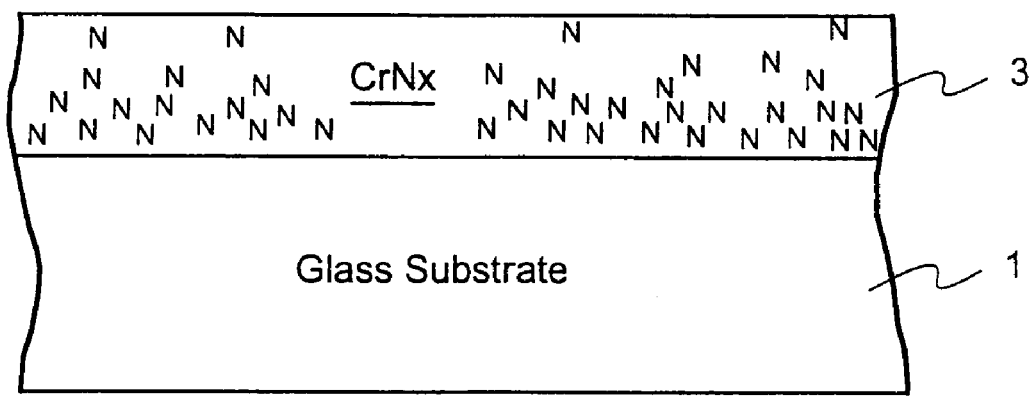
FIG. 5 is a cross sectional view of a first surface mirror according to another example embodiment of this invention.

FIG. 5 illustrates another example embodiment of this invention. In the FIG. 5 embodiment, the CrN$_x$ layer 3 is nitrogen graded so as to include more nitrogen at one portion thereof than at another portion thereof. The use of "N" in the layer 3 in FIG. 5 is illustrate of nitrogen content. Thus, in the FIG. 5 embodiment, a portion of the CrN$_x$ layer 3 closer to the glass substrate 1 includes more nitrogen than does a portion of the layer 3 further from the glass substrate. This grading may be continuous of step-wise in different embodiments of this invention. In certain example instances of the FIG. 5 embodiment, the portion of CrN$_x$ layer 3 furthest from the substrate 1 has less nitrogen content (e.g., little or no nitrogen) than does the portion of the layer 3 closest to the glass substrate 1.

In certain example embodiments of this invention, it has been found that the amount of nitrogen added to the Cr inclusive layer leads to unexpected results. In particular, as shown in FIG. 2 for example, if too little (e.g., 0% or very little) nitrogen is added to the Cr inclusive layer, then there may be a pinhole problem relating to large numbers of pinholes. Moreover, if too much nitrogen is added to the Cr inclusive layer, then reflectance suffers and/or film side reflective b* color becomes undesirable (e.g., b* becomes too large and significant yellow color can result). Thus, a particular amount of nitrogen is added in certain example non-limiting embodiments of this invention. For example, in certain example embodiments layer 3 comprises CrN$_x$, where x is from 0.01 to 0.5, more preferably from 0.01 to 0.4, still more preferably from 0.01 to 0.25, even more preferably from 0.01 to 0.20, and still more preferably from 0.05 to 0.15 (with respect to atomic percentage).

Moreover, in certain example embodiments of this invention the percentage of nitrogen gas (of the total gas flow used in sputtering the CrN$_x$ layer 3) used in sputtering is from about 1-21%, more preferably from about 3-19%, and even more preferably from 5-18%.

EXAMPLES

The following example first surface mirrors were made and tested, but are not intended to be limiting. Example 1 had a layer stack of glass/Cr, whereas the other examples all had a layer stack of glass/CrN$_x$ as shown in FIG. 1. The glass substrate 1 was about 2.3 mm thick. The examples were made by sputtering the Cr inclusive layer on the substrate using a Cr sputtering target in a gas atmosphere, using the following process parameters. Lower linespeeds were used for thicker layers and thus less visible transmission if desired.

|  | Ex. 1 | Ex. 2 | Ex. 3 | Ex. 4 | Ex. 5 | Ex. 6 | Ex. 7 |
| --- | --- | --- | --- | --- | --- | --- | --- |
| N$_2$ gas flow (sccm): | 0 | 92 | 131 | 131 | 160 | 198 | 94 |
| Ar gas flow (sccm): | 970 | 878 | 825 | 825 | 790 | 747 | 878 |
| Total gas (sccm): | 970 | 970 | 956 | 956 | 950 | 945 | 972 |
| % N gas flow: | 0 | 9% | 14% | 14% | 17% | 21% | 10% |
| Linespeed (ipm): | 160 | 160 | 142 | 150 | 142 | 85 | 90 |
| pressure (mTorr): | 2.6 | 2.5 | 2.4 | 2.4 | 2.3 | 2.2 | 2.5 |

It was found that the mirrors of Examples 2-6 (which included nitrogen in the Cr inclusive layer 3) had much fewer pinholes than did the mirror of Example 1 (which had a metallic Cr layer 3—thus, no nitrogen). Certain of these examples, and others, were used to accumulate the data shown in FIGS. 2-3, evidencing the unexpected results with respect to less pinholes and improved durability.

Moreover, Examples 1-6 had the following optical characteristics (the optical data was measured using a Hunter Ultrascan XE during the run; reflectance/color was film side reflective):

|  | Ex. 1 | Ex. 2 | Ex. 3 | Ex. 4 | Ex. 5 | Ex. 6 | Ex. 7 |
|---|---|---|---|---|---|---|---|
| Reflectance (RfY %): | 65.88 | 64.96 | 64.24 | 63.97 | 63.64 | 62.68 | 65.13 |
| a*: | −1.05 | −0.52 | −0.15 | −0.12 | 0.12 | 0.55 | −0.15 |
| b*: | −1.02 | 0.31 | 0.67 | 0.7 | 1.08 | 1.64 | 0.43 |
| Visible Transmission (TY %): | 2.55 | 2.53 | 2.28 | 2.52 | 2.53 | 0.69 | 0.43 |

It can be seen that Examples 6-7 had lower visible transmissions since lower linespeeds and thus higher layer thicknesses were used. Moreover, it can be seen from the above that higher nitrogen flows cause the b* value to increase toward yellow which may be undesirable in certain example non-limiting instances.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the coatings discussed herein may in some instances be used in back surface mirror applications, different materials may be used, additional or fewer layers may be provided, and/or the like.

The invention claimed is:

1. A mirror comprising:
   a substrate supporting a coating,
   wherein the coating includes at least a reflective layer comprising chromium nitride,
   wherein the chromium nitride is represented by $CrN_x$, where x is from 0.01 to 0.25;
   wherein the mirror has a visible transmission of no greater than 5%, and wherein the mirror has a film side reflectance of at least 60%;
   a metallic Cr layer located over the layer comprising chromium nitride; and
   wherein the layer comprising chromium nitride is nitrogen graded so that a first portion thereof contains more nitrogen than a second portion thereof.

2. The mirror of claim 1, wherein the mirror has a visible transmission of no greater than 2.0%.

3. The mirror of claim 1, wherein the substrate is composed of glass, and wherein the layer comprising chromium nitride is located on and in direct contact with the substrate.

4. The mirror of claim 1, wherein a dielectric layer is provided between the substrate and the layer comprising chromium nitride.

5. The mirror of claim 1, wherein the chromium nitride is represented by $CrN_x$, where x is from 0.01 to 0.15.

6. The mirror of claim 1, wherein the layer comprising chromium nitride is from 200 to 700 Å thick.

7. The mirror of claim 1, wherein the layer comprising chromium nitride is from 250 to 600 Å thick.

8. The mirror of claim 1, wherein the mirror is a first surface mirror.

9. The mirror of claim 1, wherein the mirror has film side reflective a* color of from −2.0 to +2.0, and film side reflective b* color of from −3.0 to +1.5.

10. The mirror of claim 1, wherein the mirror has film side reflective a* color of from −1.0 to +1.0, and film side reflective b* color of from −1.5 to +1.0.

11. The mirror of claim 1, wherein the metallic Cr layer located over the layer comprising chromium nitride is the uppermost layer of the coating and exposed to atmosphere in the final mirror product.

12. A mirror comprising:
   a substrate supporting a coating,
   wherein the coating includes at least a reflective layer comprising chromium nitride, wherein the chromium nitride is represented by $CrN_x$, where x is from 0.01 to 0.25;
   wherein the mirror has a visible transmission of no greater than 5%, and wherein the mirror has a film side reflectance of at least 60%;
   a metallic Cr layer located over the layer comprising chromium nitride; and
   wherein a first portion of the layer comprising chromium nitride located closer to the substrate contains more nitrogen than does a second portion of the layer comprising chromium nitride that is located further from the substrate.

* * * * *